United States Patent

[11] 3,539,100

| [72] | Inventors | Robert M. Scanlon, and<br>Charles B. Gentry, Grand Rapids,<br>Michigan |
|---|---|---|
| [21] | Appl. No. | 749,876 |
| [22] | Filed | Aug. 2, 1968 |
| [45] | Patented | Nov. 10, 1970 |
| [73] | Assignee | Granco Equipment Inc.<br>Grand Rapids, Michigan<br>a corporation of Delaware |

[54] TEMPERATURE SENSING OF BILLETS
10 Claims, 10 Drawing Figs.

[52] U.S. Cl. .................................................. 236/15;
73/359; 263/6
[51] Int. Cl. ................................................. F27b 9/40;
F23n 5/10; G01k 1/14
[50] Field of Search ........................................... 266/(Consult); 236/15(A), 51, 20(A); 72/13; 73/359; 263/6;
136/221

[56] References Cited
UNITED STATES PATENTS

| 2,703,495 | 3/1955 | Benninghoff .................. | 136/221X |
| 2,988,582 | 6/1961 | McGregor et al ............. | 136/221 |
| 3,398,580 | 8/1968 | Nyman et al .................. | 73/359 |
| 3,409,217 | 11/1968 | Gentry .......................... | 236/15 |

Primary Examiner—William E. Wayner
Attorney—John E. McGarry

ABSTRACT: This disclosure relates to a temperature sensing system for metal billets which are intermittently pushed through an elongated furnace chamber. The billets are contacted by probes within the furnace chamber and preferably penetrate the outer layer of metal to form a thermocouple circuit including the billet. The probes are rotatably mounted so that the tips of the probes can shift with the thermal expansion of the billets. The probes are withdrawn from contact with the billets after they have rotated a predetermined amount and reset in a different position toward the entrance end of the furnace to avoid damage to the probes.

INVENTORS
ROBERT M. SCANLON
CHARLES B. GENTRY
BY
ATTORNEYS

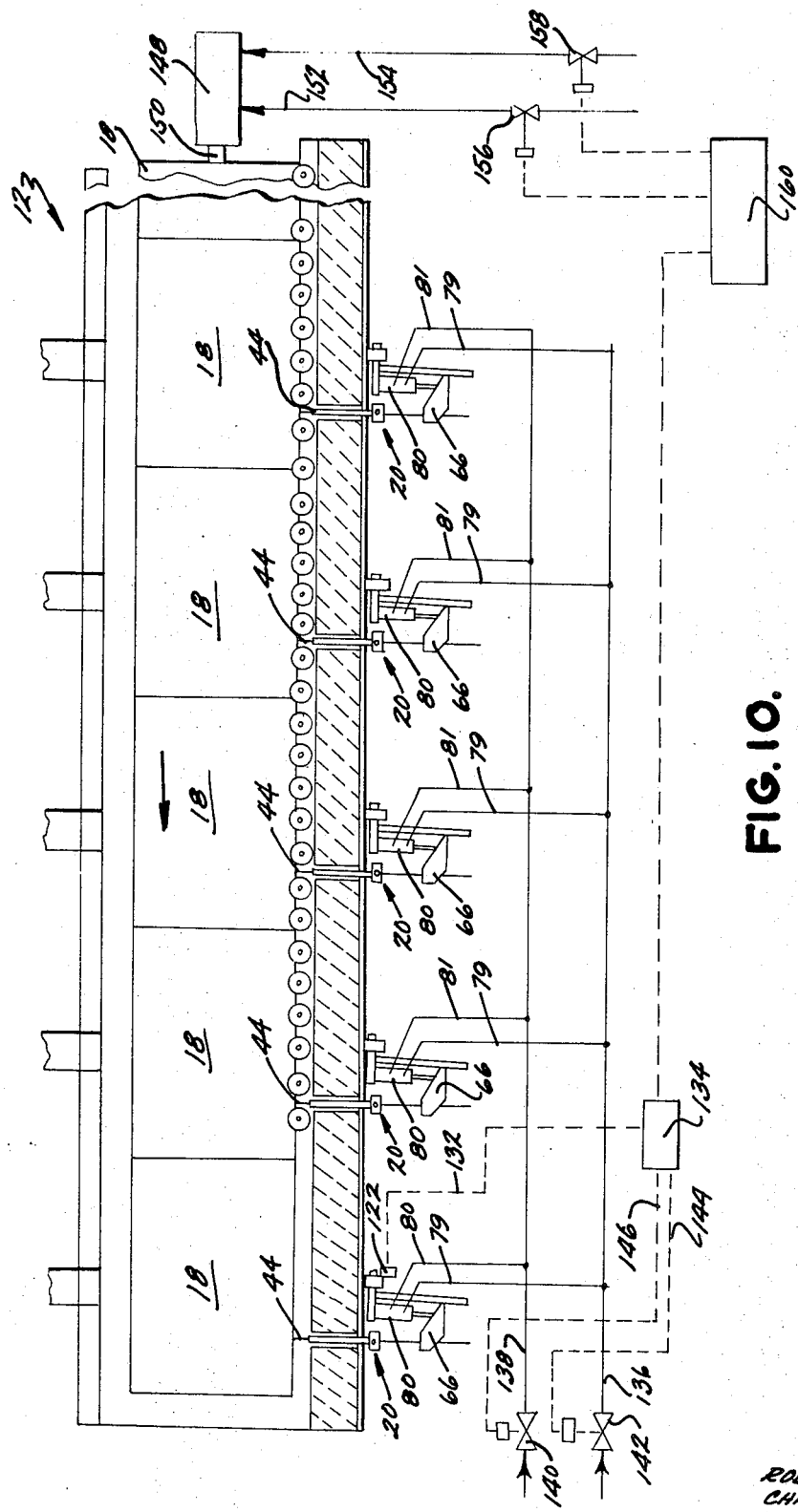

3,539,100

TEMPERATURE SENSING OF BILLETS

This invention relates to heating metal billets and temperature control therefor. In one of its aspects, the invention relates to an apparatus for heating metal billets having a furnace chamber with an exit and entrance, heating means spaced between the entrance and exit for heating the metal billets, means intermittently moving the metals through the furnace, temperature sensing means projecting into the furnace in contact with at least one of the billets, reciprocable supporting means for the temperature sensing means for moving the temperature sensing means into and out of contact with the billets, wherein the reciprocable supporting means are pivotably mounted relative to the furnace such that as the billets expand due to heating with the temperature sensing means in contact therewith, the end of the temperature sensing means in contact with the billet moves with the billet to prevent damage to the temperature sensing means.

In another of its aspects, the invention relates to a process for heating metal billets wherein the billets are pushed intermittently end to end through an elongated furnace heating zone, the temperature of the billets is sensed by probes which contact, and preferably penetrate, the billet outer surface, the probes are mounted so that the tips of the probes can shift laterally toward the exit end of the heating zone with the thermal expansion of the billets and, the probes are periodically withdrawn from contact with the billets and reset such that the tips are moved toward the entrance end of the heating zone relative to the billets whereby deleterious bending of the probes due to thermal expansion of the billets is avoided.

In copending Ser. No. 686,648, filed Nov. 29, 1967, now U.S. Pat. No. 3,409,217, issued Nov. 5, 1968 there is disclosed and claimed a method and apparatus for heating and sensing the temperature of metal billets. The temperature sensing means comprises probes which extend up through the bottom of the furnace chamber into a protected area and penetrate the outer surface of the metal billets. A pair of probes are employed and a thermocouple circuit is made using a portion of the billet to complete the circuit. The temperature probes are reciprocably mounted to that they can be withdrawn during the intermittent movement of the billets through the furnace.

In this type of furnace wherein the billets are intermittently pushed from an entrance end to an exit end of the furnace, the billets are in end-to-end contact throughout the length of the furnace. During startup, the billets are cold and are heated to a high temperature while remaining relatively fixed within the furnace. As the billets are heated, they expand in all directions. This expansion is not too noticeable in a single billet. However, in a long line of billets where one end of the line of billets is fixed, the other end of the billets will undergo a noticeable movement away from the fixed end. Thus, in the pusher billet heating furnace, the billets closest to the end of the furnace will move noticeably due to thermal expansion during the heating of the billets. The effect of thermal expansion is most noticeable during startup of the furnace but also occurs to a lesser extent during normal operation of the furnace. In the latter situation, each billet in each zone of the furnace is heated a predetermined amount while stationary within that zone, thus a certain amount of expansion in the billet train takes place.

When the thermocouple or temperature sensing probes are in contact with the billet, the expansion tends to force the fixed probes axially towards the end of the furnace chamber. In some cases, the expansion can be so great as to bend the probes laterally making it difficult to withdraw the probes for the intermittent movement of the billets. In addition, the lateral force on the probes establishes stresses in the probes so as to cause inaccurate thermocouple readings.

We have now discovered that the problem of damage to the probes and inaccurate thermocouple readings due to billet thermal expansion can be eliminated by mounting the probes so that the tips move with the billets as they expand, and further by providing means to reset the probes in the billets after a predetermined amount of movement of the probe tips.

By various aspects of this invention one or more of the following, or other, objects can be obtained.

It is an object of this invention to provide an improved temperature sensing system for a metal billet heating furnace.

It is a further object of this invention to prevent damage to temperature sensing probes in a pusher billet heating furnace, wherein the damage normally results from thermal expansion of the billets during heating.

It is a further object of this invention to provide an improved method of heating metal billets in a pusher furnace wherein the temperature of the billets is sensed by probes which contact the billets.

It is a further object of this invention to provide a temperature sensing system for heating metal billets in which system the thermocouple probes penetrate the surface of the metal billets, wherein the frequency with which the probes are reset in the billets is minimized, thereby minimizing probe wear.

It is yet another object of this invention to provide a method and apparatus for automatically resetting temperature probes in billets in a temperature sensing system for billets wherein the billets are heated in a pusher furnace, the billets are pushed end-to-end through the furnace, the resetting is responsive to the movement of the tips of the probes are predetermined amount as the billets expand within the furnace.

Other aspects, objects, and the several advantages of this invention are apparent to one skilled in the art from a study of this disclosure, the drawings, and the appended claims.

According to the invention, there is provided an apparatus for heating metal billets in a furnace having an entrance and exit end. The heating means are spaced between the entrance and exit end and means are provided for intermittently moving the billets through the furnace. Temperature sensing means project into the furnace in contact with at least one of the billets. The temperature sensing means are reciprocably supported for moving in contact and out of contact with the billets so that the temperature sensing means can be withdrawn from contact with the billets as the billets are pushed through the furnace. According to the invention, the reciprocable supporting means are mounted relative to the furnace such that as the billets expand due to heating with the temperature sensing means in contact with the billets, the end of the temperature sensing means in contact with the billet moves with the billet to prevent damage to the temperature sensing means.

Preferably, the reciprocal supporting means are pivotably mounted relative to the furnace and switch means are associated with the supporting means to actuate the reciprocable supporting means to reset the temperature sensing means in contact with the billet when the reciprocal supporting means has rotated a predetermined amount.

Further according to the invention, there is provided a method for sensing the temperature of metal billets which are pushed intermittently end-to-end through an elongated furnace heating zone. The temperature of the billets is sensed by probes which contact, and preferably penetrate the outer surface of the billets. The probes are mounted so that the tips of the probes can shift laterally toward the exit end of the heating zone with thermal expansion of the billets. The probes are periodically withdrawn from contact with the billets, and the probe tips are reset in a position toward the entrance end of the heating zone whereby deleterious bending of the probes due to expansion of the billets is avoided.

The invention will now be described with reference to the accompanying drawings which illustrate an embodiment of the invention.

FIG. 10 is a schematic representation of a system employing a plurality of pivotably mounted temperature probes.

Figure 1:
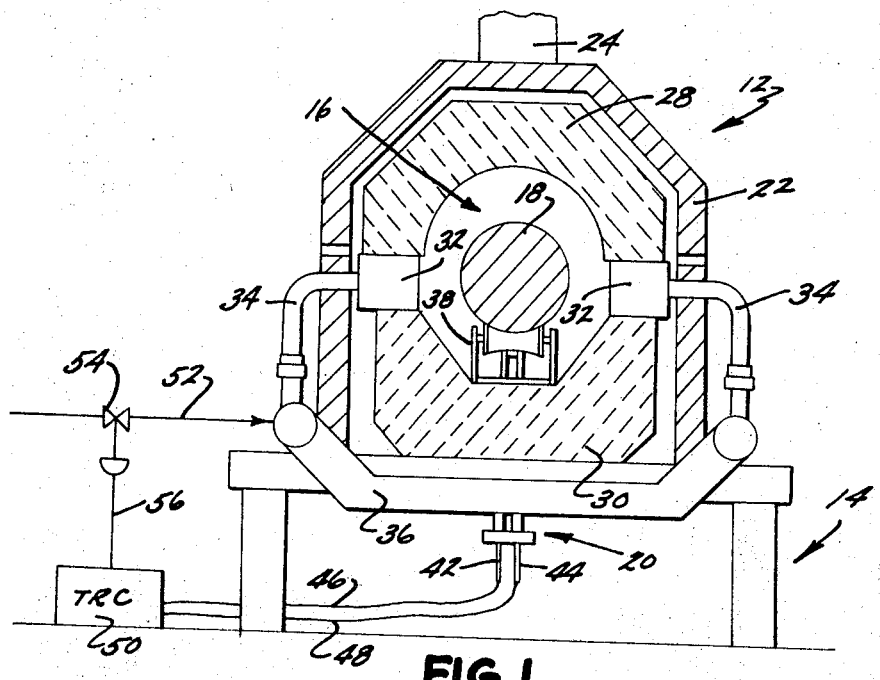
FIG. 1 is a cross-sectional view through a billet heating furnace.
Figure 2:
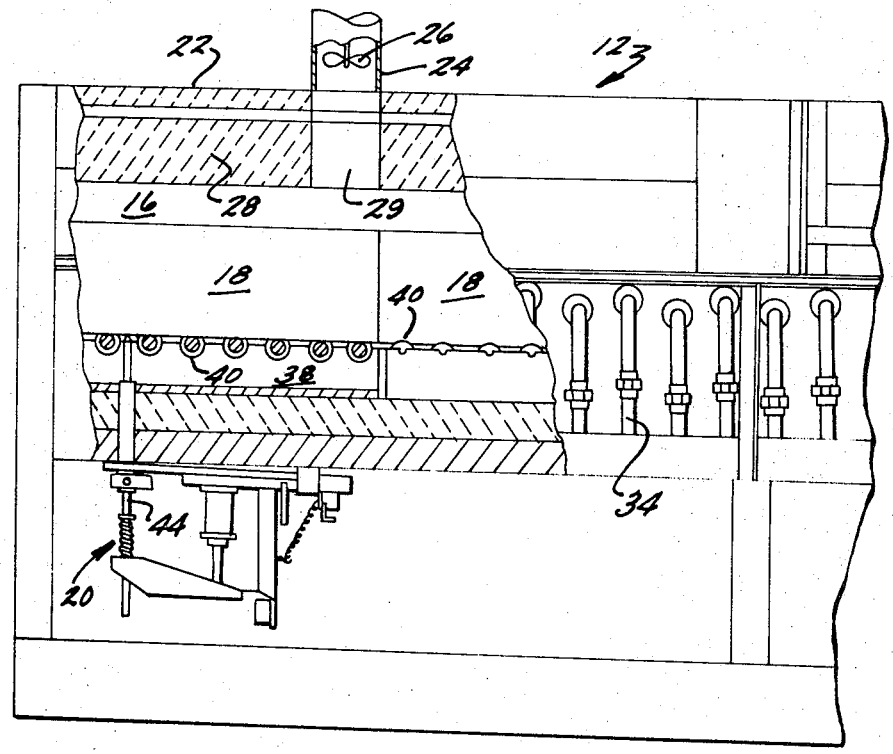
FIG. 2 is a side elevational view, partly in section, of the billet heating furnace shown in FIG. 1.

Reference is now made to the drawings, and in particular to FIGS. 1 and 2. A billet heating furnace 12 is positioned on a supporting base 14 and has a central longitudinal heating chamber 16. Billets 18 are intermittently pushed end-to-end through the central heating chamber 16 by pushing the billet at the entrance end of the furnace. A temperature probe system 20 is provided to project through the bottom of the furnace, to contact the billets 18, and sense the temperature of the billets. The amount of fuel supplied to the furnace is then controlled according to the temperature of the billets.

The furnace has an external casing 22 with an exhaust conduit 24 and an exhaust fan 26 for removing the hot gases from the central heating chamber 16. Refractory top sections 28 have a plurality of openings 29 adjacent the exhaust conduits 24 to permit the hot gases in the heating chamber 16 to be withdrawn through the exhaust conduit 24. The furnace has a refractory top section 28, a refractory bottom section 30, and burners 32 spaced along the sides of the furnace. The burners have fuel fed thereto through pipes 34 and from a central header 36. The burners are such that the billets are heated by direct impingement of the flame on the billets 18.

The billets are supported on a U-shaped channel 38 and rollers 40 which are journaled in the sides of the channel 38. Portions of the bottom of the U-shaped channel 38 are open to permit the temperature probes to pass therethrough to contact the billets 18.

The temperature probe system 20 comprises probes 42 and 44 which have tips at the upper portion thereof which contact and penetrate the outer surface of the billets 18. The probes 42 and 44 are made of thermocouple material such as the well known Chromel-Alumel system. The thermocouple probes form a circuit including a portion of the billets 18 after they penetrate the surface of the billets. The current generated by the thermocouple probes 42 and 48 is transmitted to temperature recorder controller 50 through leads 46 and 48. The temperature recorder controller 50 converts the signal generated by the probes 42 and 44 into a temperature reading and accordingly controls a valve 54 which supplies fuel through line 52 to header 36. A lead 56 transmits a signal to the valve 54 for controlling the amount of fuel passing through line 52.

Reference is now made to FIGS. 3 through 9 for the details of the temperature probe system.

Each temperature probe 42 and 44 is positioned within insulated tubes 58 and 60. The probes are supported by a housing 66 through springs 62 and collars 60 which are attached to the bottom portion of the probes 42 and 44. The housing has a plate 64 which is laterally slidable therein between inwardly bent flanges 68 and 70 and horizontal bars 72 and 74. This sliding plate permits the probes to be easily and quickly withdrawn from the housing 66, and permits new probes to be substituted for worn probes rapidly while the furnace is operating.

The housing 66 has fixed thereto a base plate 76 and a rigidity plate 78. A U-shaped member 84 is also fixed to one end of the housing 66. The housing 66 is supported by a fluid cylinder 80 having fluid supply lines 79 and 81 and an extendible piston rod 82. The housing 66 thus is supported for reciprocation by the fluid cylinder 80 and in turn for reciprocation of the probes into and out of contact with the billets 18.

A U-shaped guide 86 is provided to mate with the U-shaped member 84 to provide a stabilizing guide for the reciprocatory motion of housing 66. The U-shaped guide has inwardly facing grooves 87 which cooperate with outwardly facing grooves 85 to provide a track for ball bearings 88.

Both the fluid cylinder 80 and the U-shaped guide 86 are supported on a support housing 90. A top plate 92, a pair of side plates 94 and 96, and a pair of support bars 98 and 100 form the support housing 90. The fluid cylinder 80 and the U-shaped guide 86 are fixed to a sliding plate 102 (FIG. 6) which is supported on support bars 98 and 100.

A top supporting plate 110 is fixed to the bottom of the furnace and has a pair of depending flanges 12 and 14 with inwardly directed stop plates 116 and 118 attached respectively to each depending flange. The top plate 110 also has a pair of support brackets 124 having an axle 126 extending inwardly and supporting cooling block 128. The cooling block 128 is fixed to support housing top plate 92 so that the support housing 90 is pivotable about the axle 26. In this manner, the support housing 90 is pivotable about an axis transverse to the direction of movement of the billets 18 through the furnace chamber. The downward rotation of the support housing 90 about axle 126 is limited by the contacting of support housing side plates 94 and 96 with the fixed stop plates 116 and 118. Due to the weight of the probe supporting structure, the support housing 90 will be at rest in the position shown in FIG. 5, i.e. with side plates 94 and 96 in contact with stop plates 116 and 118.

Depending flange 112 has a plate 106 attached thereto at the bottom portion thereof. The plate 106 engages a spring 108 which is attached at the other end to side flange 104 on guide 86. The spring 108 does not have sufficient tension to raise the support housing 90 from the rest position shown in FIG. 5. However, the spring aids in raising the support housing so that it can pivot in a clockwise direction seen in FIGS. 3, 7, and 8, with a slight additional force.

Figure 7:
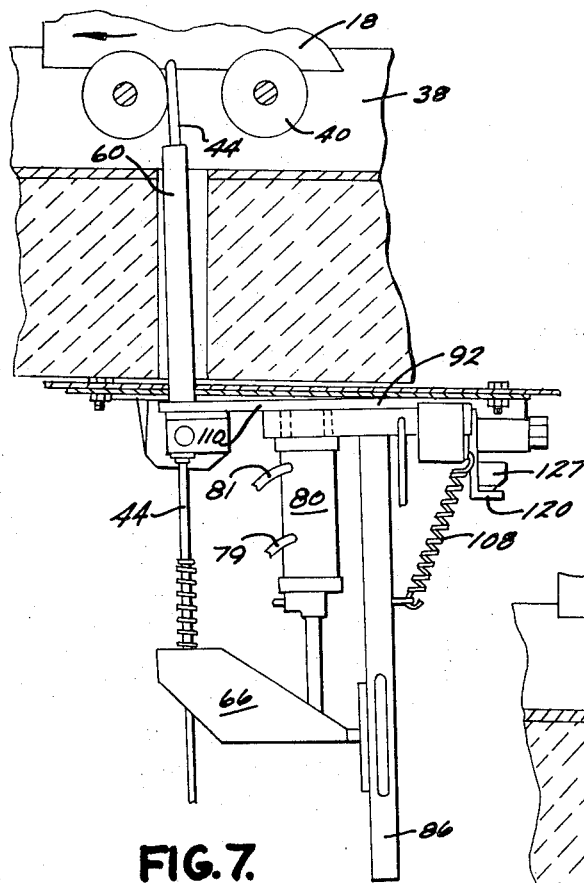
FIG. 7 is a view like FIG. 3 illustrating the movement of the temperature probe.

A microswitch 122 is fixed to the outside of top plate 110 through a bolt 123 and is adapted to contact the outer portion of L-shaped member 120 as the support housing 90 reaches the upper position, i.e. with top plate 92 in contact with top supporting plate 110 (FIG. 7). The bracket 120 is fixed to the end of side plate 94. Thus, as the support housing 90 rotates upwardly, the bracket 120 will contact switch 122. When the support housing 90 rotates away from the bottom of the furnace, the L-shaped member 120 will move out of contact with the microswitch 122.

The probes 42 and 44 are slidable within the cooling block 128. An air hose 130 supplies cooling fluid to the probes as shown and described in said copending Ser. No. 686,648 which is incorporated herein by reference.

Figure 3:
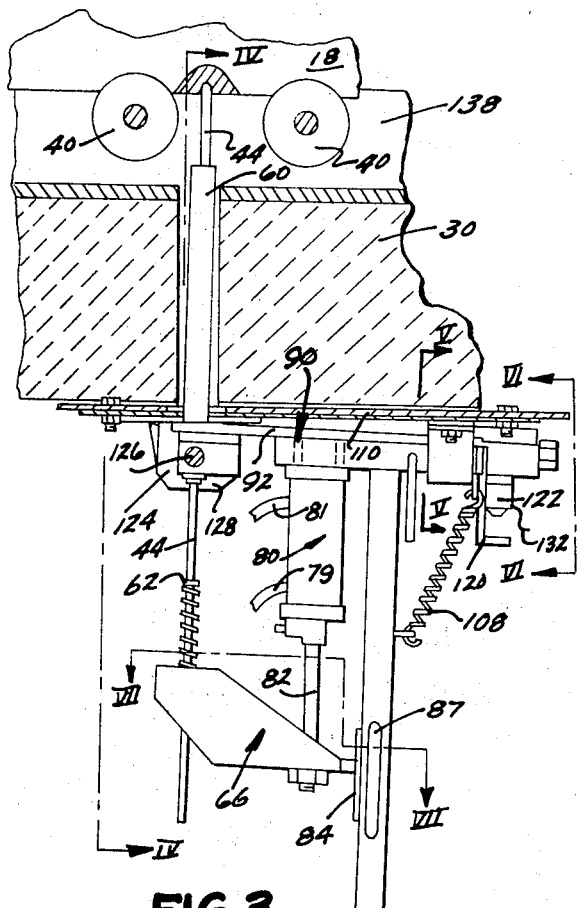
FIG. 3 is a detailed enlarged view of a portion of the furnace shown in FIG. 2.
Figure 4:
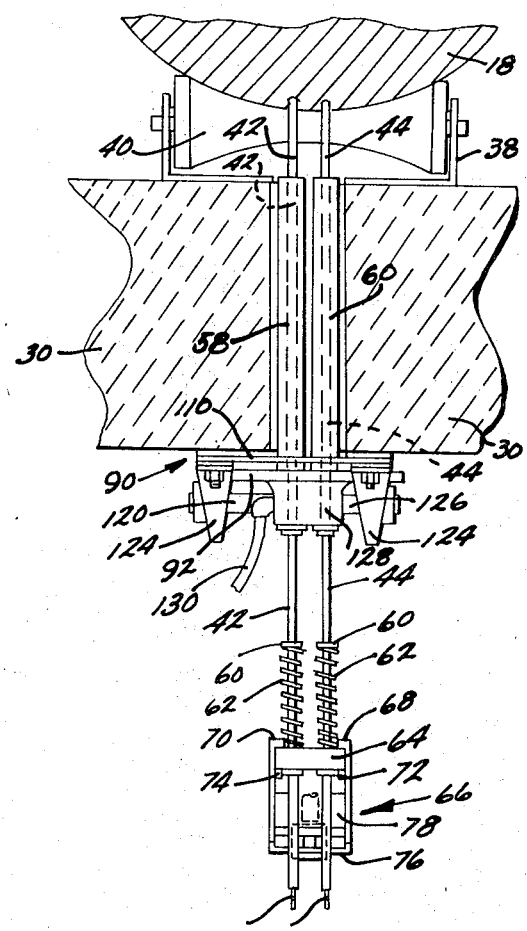
FIG. 4 is a sectional view taken along lines IV–IV of FIG. 3.
Figure 5:
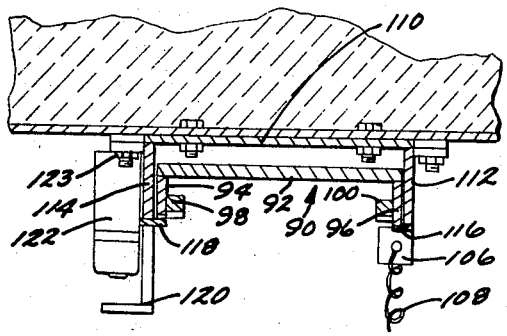
FIG. 5 is a sectional view taken along lines V–V of FIG. 3.
Figure 6:
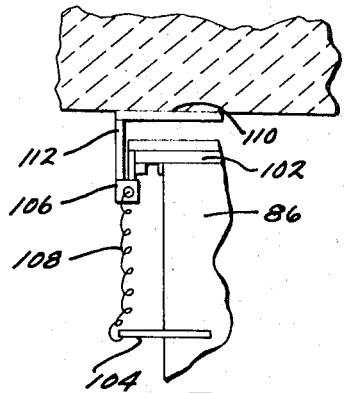
FIG. 6 is a partial sectional view taken along lines VI–VI of FIG. 3.
Figure 8:
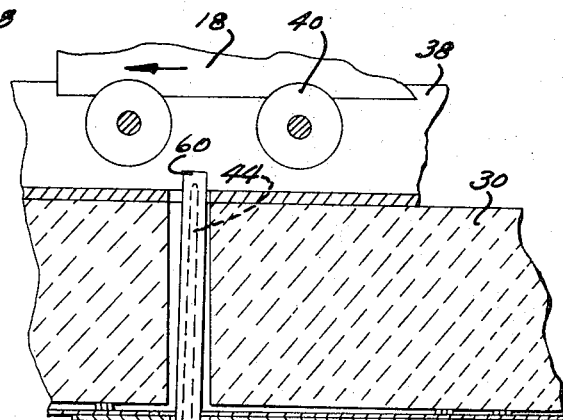
FIG. 8 is a view, like FIGS. 3 and 7, illustrating the resetting action of the probe supporting means.
Figure 9:
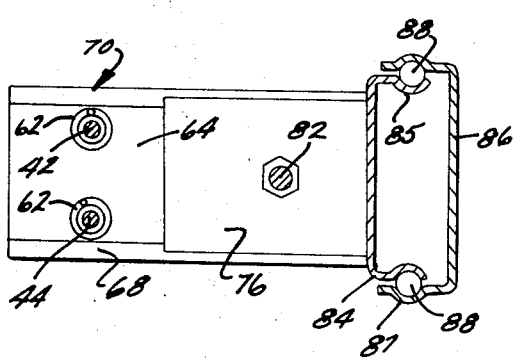
FIG. 9 is a sectional view taken along lines IX–IX of FIG. 3.

Thus, with the structure described, the temperature sending probes 42 and 44 are mounted for contact with and penetration of billets 18. When initial contact is made, the probes are in the position shown in FIG. 3. During the heating of the billet, the billets 18 slowly move to the left in FIGS. 3, 7, and 8. The movement of the billets to the left, as seen in FIGS. 3, 7, and 8, will cause the tips of the probes to move in the same direction thereby applying force on the support housing 90 to rotate in a direction counterclockwise with the aid of the spring 108. If the expansion is great enough, the probes will move to the position shown in FIG. 7 whereupon the L-shaped member 120 will contact the microswitch 122.

The microswitch 122 is connected by a signal lead 132 to a controller which actuates the air cylinder 80 to extend rod 82 thereby withdrawing the probes 42 and 44 from contact with the billet 18. When this happens, the natural weight of the support housing 90 and its associated apparatus will cause the probe supporting structure to rotate downwardly thereby moving the withdrawn probes 42 and 44 to the right as illustrated in FIG. 8. The supporting structure will be in the position shown in FIG. 5 and 8. At this point, the fluid cylinder 80 can be actuated to retract extendible piston rod 82 so that the probes 42 and 44 are reset in billet 18 to the position shown in FIG. 3.

Reference is now made to FIG. 10 which shows a system employing a plurality of similar temperature sensing probes with appropriate supporting apparatus. As viewed in FIG. 10, the billets move through the furnace from right to left. Each zone within the furnace has a temperature sensing probe system such as that hereinbefore described with reference to FIGS. 3 through 9. The temperature probe system 20 near the exit end of the furnace has a microswitch 122 whereas the other temperature probe systems 20 spaced along the furnace heating chamber do not have a microswitch.

In the system shown in FIG. 10, fluid pressure supply lines 136 and 138 supply fluid to either end of each fluid cylinder 80 for reciprocating the probes 42 and 44 into and out of contact with the billets 18. The flow of fluid pressure through supply lines 136 and 138 is controlled by valves 140 and 142. The signal lead 132 from microswitch 122 relays the signal from microswitch 122 to a controller 134 which signals valves 140 and 142 through leads 146 and 144 respectively, to operate the same. When the probes are in the retracted position, i.e. when the piston rods 82 are extended, the billets are pushed into a proper heating zone by actuation of a suitable pusher mechanism such as a fluid cylinder 148 having an extendible piston rod 150 which is actuated by fluid supplied through fluid supply lines 152 and 154. The probes 42 and 44 are then set in place in each billet 18 by retracting the piston rod 82. As the billets expand during the heating process, the probes will move from the position shown in FIG. 3 toward the left as seen in FIGS. 3 and 10. The movement will be taken up by the rotation of the supporting structure about axle 126. As the end probe system reaches the position shown in FIG. 7, the microswitch 122 will be actuated to open valve 140 and close valve 142. Means (not shown) are provided for releasing the pressure in line 136 so that the piston rods 82 can extend to withdraw probes 42 and 44 from contact with billets 18. Each probe supporting structure will then rotate back to the initial starting position such as illustrated in FIG. 8, and the controller 134 will close valve 140 and open valve 142 to retract the piston rods 82 so that the probes 42 and 44 again contact the billets 18. Conventional means (not shown) are provided for releasing the pressure in lines 81 so that the piston rods 82 can be retracted.

As an adjunct to the present system, means can be provided to prevent actuation of fluid cylinder 148 to push the billets 18 through the furnace unless the probes 42 and 44 are not in contact with the billets 18. To this end, valves 156 and 158 are provided on fluid supply lines 152 and 154. The valves 156 and 158 are controlled by a controller 160. A switch on controller 160 is thrown to cause valve 158 to open and valve 156 to close in order to push billets 18 through the furnace. A signal from controller 134 blocks the signal to valve 158 unless the probes are in the retracted position. The controller 134 is actuated to retract the probes when the switch on controller 160 is thrown. In other words, the fluid cylinder 134 permits controller 160 to close valve 156 and to open valve 158.

Whereas the invention has been described with reference to a particular embodiment, the invention can take other forms. Other means can be devised, for example, for moving the tips of the probes with the expansion of the billets so as to prevent damage to the probes, and for resetting the probes responsive to a predetermined amount of movement of the probes. Other modifications will be suggested to those skilled in the art without departing from the scope of the invention which is defined in the appended claims.

We claim:

In an apparatus for heating metal billets comprising:
a furnace having an entrance and exit end;
heating means spaced between said entrance and exit end for heating said metal billets;
means for intermittently moving said billets through said furnace from said entrance to said exit end;
temperature sensing means projecting into said furnace in contact with at least one of said billets;
reciprocable supporting means for said temperature sensing means for moving said temperature sensing means into and out of contact with said billets; and
the improvement which comprises:

means mounting said reciprocable supporting means for a selected movement in a manner so as to cause corresponding movement of said temperature sensing means in the direction of movement of said billets through said furnace from an initial position such that as said billets expand due to heating with said temperature sensing means in contact therewith, the end of said temperature sensing means in contact with said billets moves with said billets without stress on said temperature sensing means to prevent damage to said temperature sensing means; and
means biasing said mounting means with respect to said furnace to return said temperature sensing means to said initial position upon withdrawing said temperature sensing means from contact with said billet.

2. The apparatus of claim 1 wherein spaced supporting means support said billets between said furnace entrance and exit, said spaced supporting means forming a protected area therebetween and beneath said billets, said temperature sensing means project up through the bottom of said furnace into said protected area to contact said billets.

3. The apparatus of claim 2 wherein said temperature sensing means comprise a pair of electrode probes which form a thermocouple when electrically connected at the ends thereof, said electrodes being adapted to penetrate the skin of said billets to complete a circuit between said electrodes.

4. The apparatus of claim 2 wherein said mounting means comprises: a first plate member pivotably supported at the bottom of said furnace such that the axis of rotation of said plate passes through said temperature sensing means and said axis of rotation is transverse to the direction of movement of said billets through said furnace; reciprocation producing means are fixed at one end thereof to said plate, and at the other end thereof to a bottom portion of said temperature sensing means in such a manner that vertical reciprocation of said temperature sensing means will be effected by actuating said reciprocation producing means.

5. The apparatus of claim 4 wherein stop means are provided to limit the extent of rotation of said plate and means biasing said plate in contact with said stop means absent forces on said temperature sensing means to rotate said plate away from said stop means.

6. The apparatus of claim 5 wherein switch means are associated with said plate and the bottom of said furnace such that said switch means is actuated to cause reciprocation of said reciprocation producing means when said plate rotates a predetermined distance away from said stop means.

7. The apparatus of claim 1 wherein there are a plurality of said temperature sensing means spaced along said furnace between said entrance and exit to sense the temperature of said billets all along said furnace, each temperature sensing means having a reciprocable supporting means for moving said temperature sensing means into and out of contact with said billets; switch means are associated with one of said temperature sensing means near said exit end of said furnace to actuate each reciprocable supporting means to reset said temperature sensing means in contact with said billets in an initial position when said supporting means for said temperature sensing means near said exit end has moved a predetermined amount.

8. In an apparatus for heating metal billets comprising:
a furnace having an entrance and exit end;
heating means spaced between said entrance and exit end for heating said metal billets;
means for intermittently moving said billets through said furnace from said entrance to said exit end;
temperature sensing means projecting into said furnace in contact with at least one of said billets;
reciprocable supporting means for said temperature sensing means for moving said temperature sensing means into and out of contact with said billets; and
the improvement which comprises:

means mounting said reciprocable supporting means for a selected movement in a manner so as to cause corresponding movement of said temperature sensing means in the direction of movement of said billets through said furnace from an initial position such that as said billets expand due to heating with said temperature sensing means in contact therewith, the end of said temperature sensing means in contact with said billets moves with said billets without stress on said temperature sensing means to prevent damage to said temperature sensing means; and switch means associated with said mounting means for actuating said reciprocable supporting means to withdraw said temperature sensing means from contact with said billet and resetting the temperature sensing means at said initial position when said mounting means has moved through a predetermined distance.

9. An apparatus for heating metal billets according to claim 8 wherein said mounting means comprises a pivotable support whose axis of rotation is perpendicular to the direction of billet movement through said furnace and passes through said temperature sensing means.

10. In a method for sensing the temperature of metal billets wherein the billets are pushed intermittently end-to-end through an elongated furnace heating zone, the temperature of said billets is sensed by probes which contact said billets, wherein thermal expansion of said billets throughout the length of said furnace heating zone causes said billets to apply a lateral force to said probes tending to deleteriously bend said probes, and to produce erroneous temperature readings, the improvement which comprises: rotatably mounting said probes relative to said furnace heating zone on an axis transverse to the direction of movement of said billets through said furnace heating zone so that the tips of said probes can shift laterally toward the exit end of said heating zone with the thermal expansion of said billets without stress on said probes, withdrawing said probes from contact with said billets responsive to the rotation of said probes about said axis through a predetermined angle, and resetting said probe tips in a position toward the entrance end of said heating zone whereby deleterious bending of said probes due to expansion of said billets is avoided.